Aug. 11, 1925.
D. C. MACFARLAND
GATE FASTENER
Filed July 20, 1922
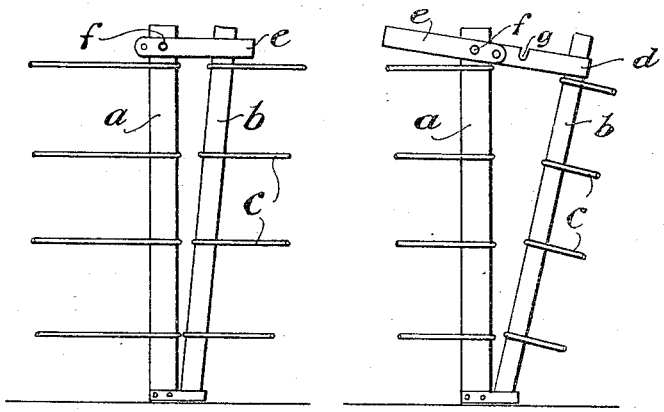
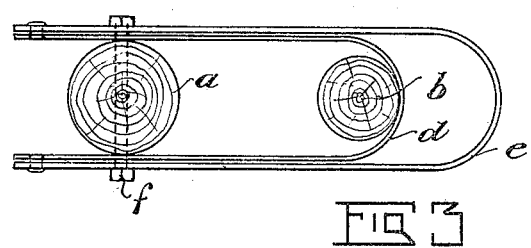
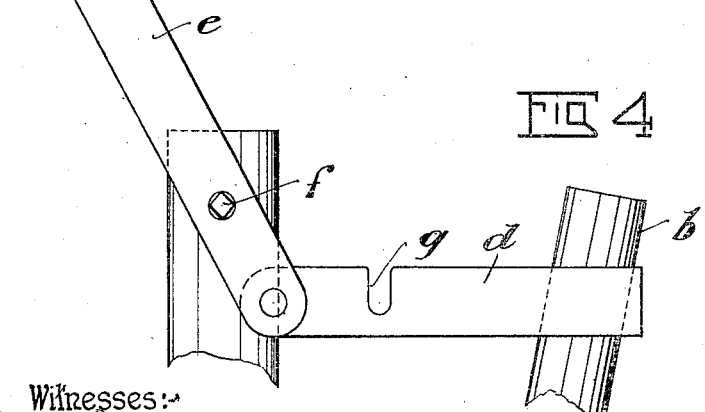
Duncan Cameron Macfarland
Inventor Patented Aug. 11, 1925.

1,549,321

UNITED STATES PATENT OFFICE.

DUNCAN CAMERON MACFARLAND, OF CALGARY, ALBERTA, CANADA.

GATE FASTENER.

Application filed July 20, 1922. Serial No. 576,328.

*To all whom it may concern:*

Be it known that I, DUNCAN CAMERON MACFARLAND, a subject of the King of Great Britain and Ireland, and residing at 207 Alberta Corner, in the city of Calgary, Province of Alberta, Dominion of Canada, have invented certain new and useful Improvements in a Gate Fastener, of which the following is a specification.

My invention relates to a new and useful gate fastener for the non-rigid type of gate so commonly used on farms for purposes of economy and for which it is necessary to stretch the flexible member such as wire, to raise the strands and prevent the escape of cattle. A great many cases of estray cattle are due to the careless fastening of these wire gates and much annoyance is caused thereby.

My device, which is illustrated in the accompanying drawing, eliminates this, is simple and inexpensive and can be operated easily.

Fig. 1 is an elevation of a gate post and the gate when closed and secured.

Fig. 2 is an elevation of the gate post and the gate when closed but not secured.

Fig. 3 is a plan view showing in detail the gate fastener and the gate post when in the position shown in Fig. 1.

Fig. 4 is a front view showing the gate fastener in the act of straining the gate.

Similar letter refers to similar parts throughout the several views.

$a$ is a gate post to which the gate fastener is secured. $b$ is the end post of a gate to which the gate wires $c$ are secured. $d$ is a rigid loop which passes over the top of the post $b$, the ends of which loop are pivoted to the ends of a crank member $e$. The crank member $e$ is also in the form of a rigid loop and is secured to the gate post $a$ by a pivot $f$. The loop end of the crank is so designed that it will fold over the loop $d$ so as to give a duplicate securing means for the gate. A slot $g$ is provided in the loop $d$ wherein the pivot $f$ passes when the crank $e$ is folded over the securing member $d$.

To open the gate it is necessary to rotate the crank $e$ upon the pivot $f$ which removes the tension from the wires of the gate and permits the easy raising of the wire member $d$ to release the end post $b$.

In closing the gate the base of the end post $b$ is first placed, and the top is then pulled towards the gate post $a$ and the member $d$ placed over it. The crank $e$ is next rotated upon the pivot $f$ until the two members $d$ and $e$ are in the position shown in Fig. 1.

Having thus described my invention, what I claim is:

A fastener comprising a U shaped lever adapted to be pivoted to a gate post, the ends of which lever project beyond the lever pivotal point on the gate post, a U shaped yoke pivoted to the ends of the said U shaped lever and extend inwardly to secure the end post of a gate, the said U shaped lever being adapted to fold over the U shaped yoke and lay in approximately the same position as the yoke and form a double securing means for the gate.

DUNCAN CAMERON MACFARLAND.

Witnesses:
GERTRUDE KIRKPATRICK,
ERIC L. HARVIE.